US007036728B2

(12) United States Patent
Tropp (10) Patent No.: US 7,036,728 B2
(45) Date of Patent: *May 2, 2006

(54) METHOD OF IMPROVING AIRLINE LUGGAGE INSPECTION

(76) Inventor: David Tropp, 165 Norfolk St., Brooklyn, NY (US) 11235

( * ) Notice: Subject to any disclaimer, the term of this patent is extended or adjusted under 35 U.S.C. 154(b) by 0 days.

This patent is subject to a terminal disclaimer.

(21) Appl. No.: 10/988,433

(22) Filed: Nov. 12, 2004

(65) Prior Publication Data

US 2005/0167494 A1    Aug. 4, 2005

Related U.S. Application Data

(63) Continuation-in-part of application No. 10/756,531, filed on Jan. 12, 2004, and a continuation-in-part of application No. 10/706,500, filed on Nov. 12, 2003.

(51) Int. Cl.
*G07B 15/02* (2006.01)
(52) U.S. Cl. ............................ 235/384; 70/284; 283/72
(58) Field of Classification Search ................ 235/384, 235/380, 382; 70/284–285, 56, 278, 312, 70/331; 283/68–69, 74, 80
See application file for complete search history.

(56) References Cited

U.S. PATENT DOCUMENTS

| 4,055,972 A | 11/1977 | Calegan |
| 4,137,567 A | 1/1979 | Grube |
| 4,499,745 A | 2/1985 | Ricouard et al. |
| 4,557,122 A | 12/1985 | Hwang |
| 4,671,088 A | 6/1987 | Jeang |
| 4,770,013 A | 9/1988 | Nakai |
| 4,866,958 A | 9/1989 | Bretl et al. |
| 4,885,923 A | 12/1989 | Nakai |
| 5,089,692 A | 2/1992 | Tonnesson |
| 5,237,842 A | 8/1993 | Rasch et al. |
| 5,274,356 A | 12/1993 | Taricco |
| 5,345,798 A | 9/1994 | Nakai |
| 5,485,734 A | 1/1996 | Yang |
| 5,507,161 A | 4/1996 | Broekaert et al. |

(Continued)

FOREIGN PATENT DOCUMENTS

| EP | 0414165 | 2/1991 |
| FR | 2686493 | 7/1993 |
| WO | WO 03/003144 A2 | 9/2003 |

OTHER PUBLICATIONS

Travel Sentry Press Release, Nov. 12, 2003.*

(Continued)

*Primary Examiner*—Thien M. Le
*Assistant Examiner*—Edwyn Labaze
(74) *Attorney, Agent, or Firm*—Steven Horowitz (57) ABSTRACT

Method of making airline luggage inspection secure while accommodating the needs of the traveler comprises making a special lock available to airline travelers, the special lock having a combination lock portion and a master key lock, the master key lock portion receiving a master key that can open the master key lock portion of any special lock of this type. The special lock is designed to be applied to an individual piece of airline luggage and has indicia conveying to luggage purchasers that the special lock is "approved" by a luggage screening authority and conveying to the luggage screening authority that the special lock can be opened using the master key. The method includes providing the luggage screening authority directly or indirectly with exclusive access to the master key. The manufacturers and/or providers of the master key and special lock retain copies of the master key.

20 Claims, 2 Drawing Sheets

U.S. PATENT DOCUMENTS

| | | | |
|---|---|---|---|
| 5,582,049 | A | 12/1996 | Mauer |
| 6,173,592 | B1 | 1/2001 | Yu |
| 6,212,920 | B1 * | 4/2001 | Winner .................... 70/38 C |
| 6,508,089 | B1 | 1/2003 | Tsai |
| 6,513,356 | B1 | 2/2003 | Yang |
| 6,557,384 | B1 | 5/2003 | Cuesta |
| 6,568,225 | B1 | 5/2003 | Chang |
| 6,598,434 | B1 | 7/2003 | Yang |
| 2002/0129628 | A1 | 9/2002 | Skalberg |
| 2002/0139155 | A1 | 10/2002 | Franzen |
| 2002/0198731 | A1 | 12/2002 | Barnes et al. |
| 2003/0089147 | A1 | 5/2003 | Yang |
| 2004/0246096 | A1 * | 12/2004 | Queenan .................... 340/5.61 |
| 2005/0081584 | A1 | 4/2005 | Nugent |
| 2005/0111618 | A1 * | 5/2005 | Sommer et al. ............. 378/57 |

OTHER PUBLICATIONS

Brookstone press Release, Nov. 12, 2003.*

CCL Security Products New Product News Release, Nov. 12, 2003.*

The Eastern Company Reports Results for the 1$^{st}$ Quarter of 2004 {S/N 109401861}.*

Sara Kemaulani Goo, TSA Under Pressure To Stop Baggage Theft, WASHINGTONPOST.COM, Jun. 29, 2003, p. AO1.

Jane Engles, Be Prepared for Hand Searches of Luggage, Los Angeles Times, Apr. 13, 2003, Post-gazette.com.

CNN, Paris Airport Arms Find: Man Held, Dec. 30, 2002, Printed from CNN.COM on Jan. 12, 2003.

Barbara De Lollis, Fliers Flood TSA with Inspection Gripes, Travel News Section, USA Today, Jul. 21, 2003.

Barbara De Lollis, Even How you Secure Luggage has Change: Travel News Section: USA Today, Sep. 1, 2003.

Getting Back the Business, Travel Goods Showcase, Jul./Aug. 2003.

Audrey Warren, Making up for the Blackout, The Wall Street Journal, Aug. 20, 2003.

* cited by examiner

FIG.1

DIALS

MASTER KEY

FIG. 2

DIAL TURN

FIG.3

COMBINATION CODE

FIG.4

METHOD OF IMPROVING AIRLINE LUGGAGE INSPECTION

PRIORITY INFORMATION

This patent application claims priority from and is a continuation-in-part patent application of U.S. patent application Ser. No. 10/706,500 previously filed by Applicant and Inventor David Tropp on Nov. 12, 2003 and which is presently pending and incorporated herein by reference in its entirety. This patent application also claims priority of and is a continuation-in-part patent application of U.S. patent application Ser. No. 10/756,531 previously filed by Applicant and Inventor David Tropp on Jan. 12, 2004 and which is presently pending and incorporated herein by reference in its entirety.

FIELD OF THE INVENTION

The field of this invention is methods of improving airline luggage inspection, and more particularly, methods of making such inspection less intrusive and more secure.

BACKGROUND OF THE INVENTION AND DISCUSSION OF THE PRIOR ART

Due to the threat of terrorism, in the weeks prior to Jan. 1, 2003, the Transportation Security Administration ("TSA"), a division of the United States Department of Homeland Security, announced that with respect to luggage at United States airports if a TSA baggage screener was unable to open a traveler's bag for inspection because the bag was locked, the screener would have to break the locks on the traveler's bag. Hence, passengers should leave their bags unlocked, according to the TSA. Beginning Jan. 1, 2003 the TSA's federal workers started screening luggage at U.S. airports and when it deemed it necessary it started clipping locks on this luggage in order to open and inspect the luggage.

Since by definition airport luggage screening occurs outside the presence of the passengers whose luggage is being inspected, it is impossible or at least impractical for airport luggage screening personnel to make use of combinations to open combination locks on airport luggage. Nonetheless, passengers may desire to use combination locks to avoid worrying about loss of a key or finding the key.

Although arguably necessary for security, the method of screening luggage that includes opening the passenger's luggage in a manner that leaves the luggage "unlockable" after the inspection process, for example by clipping the heretofore workable lock, suffers from several drawbacks. First, the passenger's belongings have been damaged either because the lock has been clipped or because the luggage has been opened forcibly or both. This causes monetary damage it also causes aggravation. Second, a new security hazard is generated since the passenger gets back a piece of luggage with a broken or removed lock. This means that during the remainder of the passenger's trip his or her luggage is not secure and can be tampered with. The remainder of the trip may even include further domestic flights. Furthermore, if travelers consistently have their locks broken, travelers will see no value in using locks when traveling, thereby exposing their unlocked luggage to a constant risk of tampering.

One should not assume that security risks exist only among passengers. Terrorists have tried in the past and may try in the future to compromise the workers at the airports who inspect luggage. Accordingly, the no longer secure piece of luggage is subject to the risk that a terrorist or other dangerous person who is within the area of the airport luggage screening personnel—because he is a worker or because he penetrated the secure area—can insert a bomb or other hazardous material into the luggage by easily opening it since it not only does not have a lock anymore but its outward appearance, i.e. a damaged lock, may advertise that it has been tampered with and be easily opened.

Furthermore, the sale of padlocks plummeted after the TSA began the practice of clipping locks. Another thing that happened was that the number of claims for theft and damage allegedly caused by the government and/or airline personnel to passengers' luggage increased significantly since Jan. 1, 2003.

Another problem is that passengers are concerned about theft of the contents of their bags without the protection of locks (after their locks have been rendered useless by the luggage screening authorities).

Travelers understand and support the federal government's initiatives to thwart terrorism. This support of security regulations and procedures on the part of travelers is critical to their implementation and success. However, travelers, just getting accustomed to the new security laws, may have legitimate concerns about baggage inspections. It is crucial that the government or appropriate authorities act to diminish travelers' concerns in this regard.

In addition, working as a TSA luggage screener is a highly demanding and stressful job. Therefore, anything that reduces the physical strain would be highly appreciated by the screeners.

It should be born in mind that the number of airline travelers who pass through airports in the United States in a given year is close to half a billion. Thus, these concerns affect a great many individuals.

Accordingly, there is a compelling and immediate need for a method of inspecting luggage at airports that does not create a security risk and that is not damaging or aggravating to the passengers.

SUMMARY OF THE PRESENT INVENTION

The present invention presents a method of making airline luggage inspection secure while accommodating the needs of the traveler includes a first step of making a special lock available to airline travelers, the special lock having a combination lock portion and a master key lock, the master key lock portion for receiving a master key that can open the master key lock portion of any special lock of this type. The special lock is designed to be applied to an individual piece of airline luggage and has an indicia thereon conveying to luggage purchasers that the special lock is "approved" by a luggage screening authority and conveying to the luggage screening authority that the special lock can be opened using the master key. Then providing the luggage screening authority with exclusive access to the master key. The manufacturers and/or providers of the master key and special lock retain copies of the master key. In accordance with the method of the present invention, therefore, the luggage screening authority need not clip or otherwise break open locks to inspect luggage, nor do they have to break into the luggage in some other manner. The workers need only be told that master keys are available to open locks that have the indicia on them.

IMPORTANT OBJECTS AND ADVANTAGES

The following important objects and advantages of the present invention are:

(1) to provide a method of screening luggage at airports that avoids forcible opening of the luggage;

(2) to provide a method of screening luggage at airports that employs special locks that remain viable after being subjected to airport luggage screening and inspection;

(3) to provide a method of non-intrusively searching passenger's luggage at airports;

(4) to provide a method of screening luggage that uses a master key exclusively maintained by the luggage screening authority;

(5) to provide a method of improving luggage screening at airports that avoids the need for clipping the locks on passenger luggage;

(6) to provide a method of screening luggage at airports that eliminates a potential security threat of tampering with broken-into luggage or luggage whose locks have been broken;

(7) to provide a method of luggage screening that reduces the costs of the luggage screening authority;

(8) to provide a method of luggage screening that eliminates the need for lock clippers;

(9) to provide a luggage screening method that reduces injuries to luggage screeners that may arise from clipping locks;

(10) to provide an improved method of luggage screening at airports that requires essentially no new training;

(11) to provide a method of airport luggage screening that reduces the liability to the luggage screening authority;

(12) to provide an improved method of luggage screening that would not interfere with current policy of the luggage screening authority in that luggage locks could still be clipped if they did not display the indicia conveying that were "TSA approved" or authorized;

(13) to provide a luggage screening method that decreases the labor of luggage screeners in that opening the special lock of the method of the present invention requires less manual labor than breaking locks;

(14) to provide a method of luggage screening that provides a public relations benefit to the TSA or luggage screening authority in that travelers will appreciate the TSA or luggage screening authority's concern for their personal property, an important benefit for new agency;

(15) to provide a method of airport luggage screening that allows the luggage screening authority to get its work done more efficiently;

(16) to provide a method of airport luggage screening that allows a thorough search of the passenger's luggage while at the same time providing a less intrusive and more comfortable search to the passenger;

(17) to provide a method of screening luggage at airports that eliminates the danger of tampering with luggage that has been broken into subsequent to the screening process; and (18) to provide a method that eliminates the need to break into the luggage at a point other than its lock.

DETAILED DESCRIPTION OF THE PREFERRED EMBODIMENT

The method of the present invention includes the step of making a special lock available to airline travelers, the special lock having a combination lock portion and having a master key lock, the master key lock portion for receiving a master key that can open the master key lock portion of any special lock of this type, the special lock designed to be applied to an individual piece of airline luggage. The special lock also has indicia associated with the special lock. In a preferred embodiment the indicia is on the special lock but the present invention contemplates that the indicia may be near by on the luggage but not on the lock or other ways of association (on a tag near the lock, etc.).

As a result of marketing the special lock to consumers or to airline travelers, the indicia conveys to luggage purchasers that the special lock is a lock that the luggage screening authority has agreed not to break. The indicia also conveys to the luggage screening authority that the special lock is a lock that the luggage screening authority has agreed not to break. This is because the luggage screening authority has previously (previous to its screeners looking for the indicia) been provided with the indicia or a special lock having the indicia and has previously agreed to follow a special procedure for processing and screening luggage having the special lock and associated indicia—that is, to look for the indicia while screening luggage and, upon finding said indicia on an individual piece of luggage, to use the master key previously provided to the luggage screening authority to, if necessary, open the individual piece of luggage having the special lock and not try to break the individual piece of luggage.

The indicia can state, for example, that the special lock is "approved", "accepted" or "authorized" by the luggage screening authority. The term "indicia" is a broad term and can also include the special lock itself (or the special lock having associated therewith) a distinctive (and in a preferred embodiment a suitably conspicuous) physical characteristic such shape, texture, weight and/or other characteristic, such as color, that makes it instantly recognizable by individuals working for the luggage screening authority who are specifically for that characteristic. Alternatively, a distinctive chemical or electronic characteristic can be used—in short any distinctive characteristic that can be instantly recognized by persons looking for it.

The phrase "any special lock of this type" is intended to include special locks having a multiplicity of sub-types such as different sizes, different manufacturing designs or styles, etc.

Besides making the special lock more valuable to prospective luggage purchasers or lock purchasers, such indicia also tells the luggage screening authority that the special lock can be opened by the luggage screening authority using the master key and that the special lock is among those locks that the luggage screening authority agrees not to break in order to inspect the luggage. The phrase "approved", "accepted" or "authorized" is a broad phrase intended to include other words or terms that signify that the luggage screening authority agrees that locks having such indicia will not be broken into.

The method of the present invention also includes the step of providing the luggage screening authority, directly or indirectly, with access to the master key. This step includes providing such access with the help of or in conjunction with another business entity, i.e. a third party. The access is to be exclusive except that one or more of the following entities may retain copies of the master key: the manufacturer of the special lock, since it may need to retool the special lock, the provider to the passengers of the special lock, which may or may not be the same as the manufacturers, the manufacturer and/or the provider of the master key to the luggage screening authority. It is anticipated that the manufacturer of the special lock will also provide the master key but other possibilities are also contemplated by the present invention.

The step of providing access may be accomplished by delivering one or more master keys to the luggage screening authority or by delivering one or master keys to a company or organization whose responsibility it is to cause said one or more master keys to be delivered to the luggage screening authority.

Access to the master key by the luggage screening authority includes having access to any appropriate number of such master keys by its workers or by any appropriate division of part of said luggage screening authority.

The preferred embodiment of the method of the present invention thus can be summarized as follows: A method of improving airline luggage inspection by a luggage screening authority, comprising making available to consumers a special lock, the special lock having a combination lock portion and having a master key lock portion, the master key lock portion for receiving a master key that can open the master key lock portion of any special lock of this type, the special lock designed to be applied to an individual piece of airline luggage, and making available to consumers an indicia associated with the special lock that matches an indicia previously provided to the luggage screening authority which the luggage screening authority has agreed to process in accordance with a special procedure, marketing the special lock to the consumers in a manner that conveys to the consumers that the special lock will be subjected by the luggage screening authority to the special procedure, and the luggage screening authority acting pursuant to a prior agreement to look for the indicia while screening luggage and, upon finding said indicia on an individual piece of luggage, to use the master key previously provided to the luggage screening authority to, if necessary, open the individual piece of luggage and not try to break the individual piece of luggage.

Although the present invention is a method of improving the inspection of airline luggage, the method of the present invention makes use of an apparatus. This apparatus is a special lock. The special lock is illustrated by reference to the accompanying drawings. Consequently, the special lock used in the method of the present invention has been assigned reference numeral 10 Other elements have been assigned the reference numerals referred to below.

Combination locks have certain advantages over locks with keys. For one thing, there is no need to fear loss of the key. Hence, it is advantageous to have combination locks on luggage used to fly with since flights tend to cause stress and stress can lead to loss of the key. Second, even if one has the key it takes time to retrieve it. If the luggage has to be opened suddenly then retrieval of the key is an inconvenience. Although combination locks require memorization of access to the coded combination, this is usually considered better than a key lock on balance to many passengers. Hence, there is a need for a method of improving luggage screening at airports that makes of a special lock that includes a unique combination but that is nonetheless convenient and secure for the passengers and for the airport luggage screening personnel.

As seen from FIGS. 1–4, special lock 10 includes a combination lock portion 20 having a unique combination and a master key lock. The master key lock portion is opened by a master key that is inserted in key hole 30. Typically, although not necessarily, the key hole would be inconspicuously placed on the bottom of the special lock 10. The combination lock portion can be any kind of combination lock portion suitable for use with a piece of luggage at an airport. The combination can be a front dial that is turned or several dials that are turned to set the combination.

Presently, the Transportation Security Administration, a division of the United States Department of Homeland Security has the task of screening travelers' luggage at airports. However, the term "luggage screening authority" is intended broadly to encompass both the Transportation Security Administration and any governmental entity or non-governmental organization whose task includes screening the luggage of travelers at airports in the United States or a non-governmental organization. Alternatively, the luggage screening authority can be a governmental entity or non-governmental organization whose task includes screening the luggage of travelers at airports in Canada or another country. Furthermore, the luggage screening authority is also intended to broadly include individual workers who screen luggage at airports and other personnel of the TSA or of some other entity or organization whose task it is to screen such luggage.

Thus, the master key allows the authorized agency's workers to have the ability to open any of the luggage that the workers inspect in a manner without clipping the lock. The indicia notifies the luggage screening authority which pieces of luggage has locks that lock the master key opens and it notifying purchasers of the special lock of an added value of the special lock. Market research exists to support the fact that customers will spend significantly more on luggage if they know that it comes with a lock that the luggage screening authorities such as the TSA recognize as being openable by their master key and without forcibly opening the luggage.

Figures 1, 2:
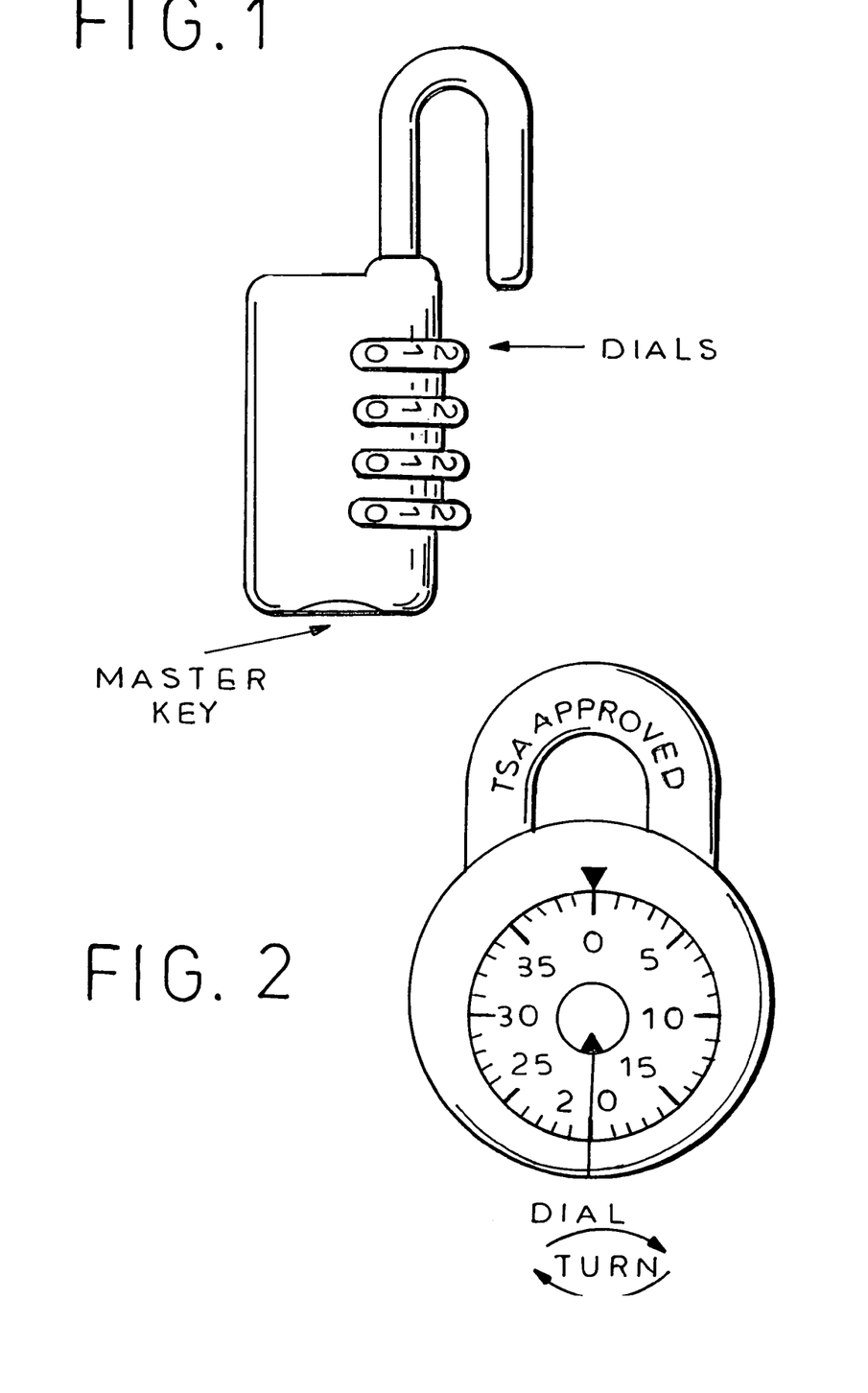
FIG. 1 is a front plan view of one embodiment of the special lock used in the method of the present invention in open position modified to show a key hole for a master key on the bottom.
FIG. 2 is a front plan view of a second embodiment of the special lock used in the method of the present invention.
Figures 3, 4:
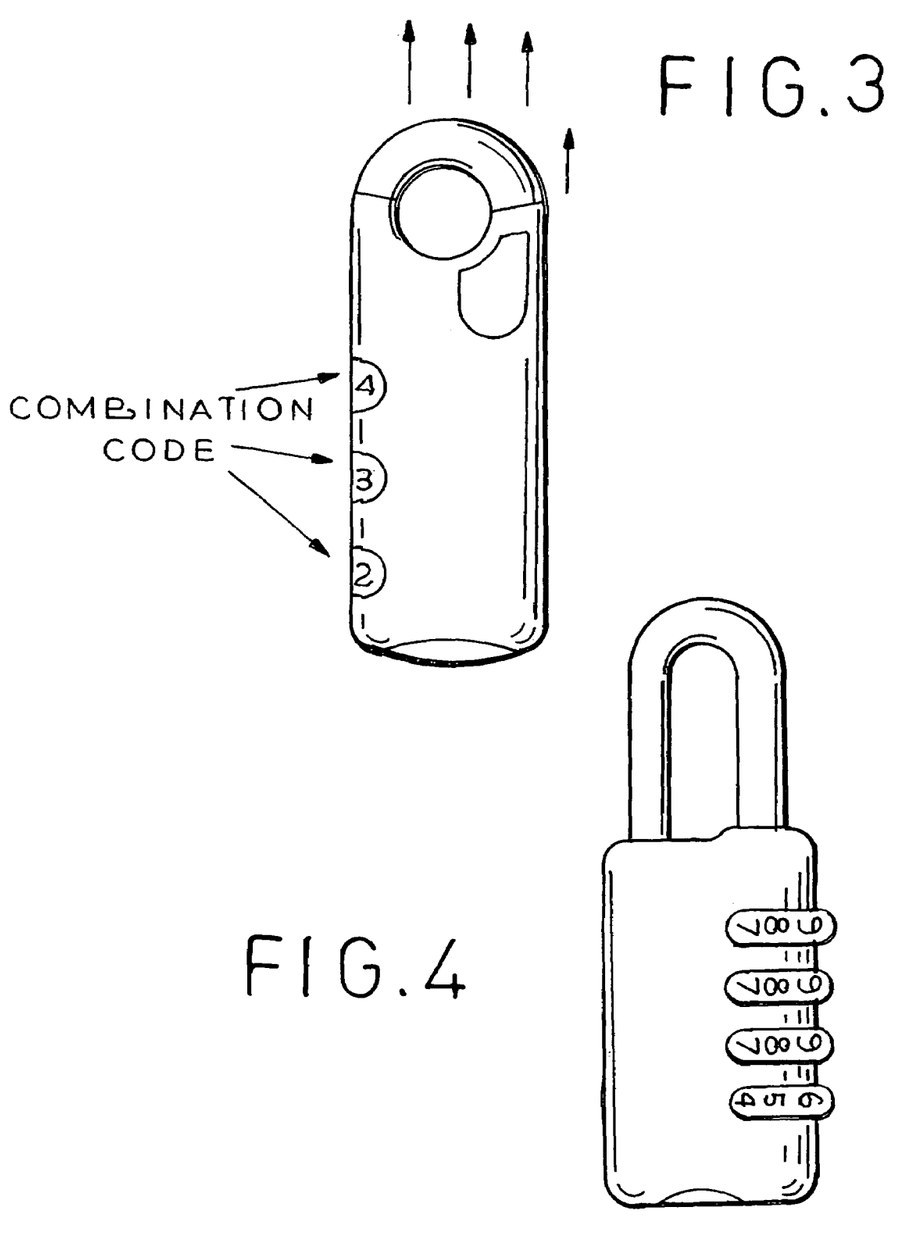
FIG. 3 is a front plan view of a second embodiment of the special lock used in the method of the present invention modified to show a key hole for a master key on the bottom.
FIG. 4 shows the special lock depicted in FIG. 1 in closed position.

As seen in FIG. 2, the indicia 50 can take the form of a phrase "approved by the TSA" or any similar phrase or it can be anything else that conveys the approval, authority, acceptance etc. by the TSA or other relevant luggage screening authority. It should be understood that although one example of the indicia appears in FIG. 2 only, the other embodiments of the special lock used in the method of the present invention would also have the indicia.

It should be noted that with the use of the special lock by the traveler, the traveler still selects a combination for the combination lock portion of the special lock 10 and the traveler has that combination for the combination lock portion part of the special lock. Accordingly, the traveler still has a useful secure lock after passing airport security. In addition, the luggage screening authority still maintains an effective and quick way of accessing airport luggage for inspection whenever it deems doing so necessary.

It should be noted that the terms "master key" and "master key lock portion" are broad terms intended to also include electronic or other sensor mechanisms for opening up the master key lock portion in special lock 10. Thus, the method of the present invention contemplates using in certain embodiments a special lock 10 that makes use of an electronic sensor instead of a traditional physical key even though such a traditional physical key is what is typically understood by the term "master key". In such a case the locking mechanism inside special lock 10 would not be a traditional master key lock mechanism but rather would be a locking mechanism that is opened by an electronic sensor.

The present invention also contemplates that in certain embodiments other lock mechanisms besides a traditional combination lock can be used as one of the locks in special lock 10. Hence, in an alternative embodiment, the method would employ a first lock portion instead of a combination lock portion in special lock 10. The first lock portion can be any kind of locking mechanism useful for and easily accessible by the passenger.

To Applicant's knowledge the luggage screening authority in the United States, namely the Transportation Security Administration, has no special requirements about the special lock for agreeing to accept the special lock in connection with the method of the present invention. In accordance with the method of the present invention, the TSA does of course have to be able to recognize the presence of and have the means to open the special lock.

It is to be understood that while the method of this invention have been described and illustrated in detail, the above-described embodiments are simply illustrative of the principles of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

What is claimed is:

1. A method of improving carrier baggage inspection by a baggage screening entity, comprising:
  making available to consumers a special lock, having a combination lock portion and having a master key lock portion, the master key lock portion for receiving a master key that can open the master key lock portion of this special lock, the special lock designed to be applied to an individual piece of carrier baggage, the special lock also having an identification structure associated therewith that matches a corresponding identification structure previously provided to the baggage screening entity, which special lock the baggage screening entity has agreed to process in accordance with a special procedure,
  marketing the special lock to the consumers in a manner that conveys to the consumers that the special lock will be subjected by the baggage screening entity to the special procedure,
  the identification structure signaling to a baggage screener of the baggage screening entity that the baggage screening entity has agreed to subject the special lock associated with the identification structure to the special procedure, and
  the baggage screening entity acting pursuant to a prior agreement to look for the identification structure while screening baggage and, upon finding said identification structure on an individual piece of baggage, to use the special procedure previously agreed to by the baggage screening entity to, if necessary, open the individual piece of baggage.

2. The method of claim 1, wherein the master key lock portion includes a key hole in the special lock that receives the master key.

3. The method of claim 1, wherein a step of making available to consumers a special lock involves selling the special lock directly or indirectly to the consumers.

4. The method of claim 1, wherein the identification structure is integrally formed with the special lock.

5. The method of claim 4, wherein the signaling involves a visual signal.

6. The method of claim 1, wherein the signaling involves a visual signal.

7. The method of claim 1, wherein a step of making available to consumers a special lock involves mass producing the special lock for ultimate provision to the consumer.

8. The method of claim 1, wherein a step of making available to consumers a special lock involves providing the identification structure to a third party and causing the especial lock to be made available to the consumer.

9. The method of claim 1, wherein a step of making available to consumers a special lock means causing the special lock having the identification structure to be made available to the consumers.

10. A method of improving carrier baggage inspection by a baggage screening entity comprising:
  making available to consumers a special lock, having a first lock portion and a master key lock portion, the master key lock portion for receiving a master key that can open the master key lock portion of this special lock, the special lock designed to be applied to an individual piece of carrier baggage, the special lock also having an identification structure associated therewith that matches a corresponding identification structure previously provided to the baggage screening entity which special lock the baggage screening entity has agreed to process in accordance with a special procedure,
  marketing the special lock to the consumers in a manner that conveys to the consumers that the special lock will be subjected by the baggage screening entity to the special procedure,
  the identification structure signaling to a baggage screener of the baggage screening entity that the baggage screening entity has agreed to subject the special lock associated with the identification structure to the special procedure, and
  the baggage screening entity acting pursuant to a prior agreement to look for the identification structure while screening baggage and, upon finding said identification structure on an individual piece of baggage, to use the special procedure previously agreed to by the baggage screening entity to, if necessary, open the individual piece of baggage.

11. The method of claim 1, wherein the identification structure is located directly on the special lock.

12. The method of claim 11, wherein a step of making available to consumers a special lock involves selling the special lock directly or indirectly to the consumers.

13. The method of claim 10, wherein the identification structure is located directly on the special lock.

14. The method of claim 13, wherein a step of making available to consumers a special lock involves selling the special lock directly or indirectly to the consumers.

15. The method of claim 10, wherein the identification structure is integrally formed with the special lock.

16. The method of claim 15, wherein the signaling involves a visual signal.

17. The method of claim 10, wherein the signaling involves a visual signal.

18. The method of claim 10, wherein a step of making available to consumers a special lock involves mass producing the special lock for ultimate provision to the consumers.

19. The method of claim 10, wherein a step of making available to consumers a special lock involves providing the identification structure to a third party and causing the special lock to be made available to the consumers.

20. The method of claim 10, wherein a step of making available to consumers a special lock means causing the special lock having the identification structure to be made available to the consumers.

* * * * *

(12) EX PARTE REEXAMINATION CERTIFICATE (8598th)
United States Patent
Tropp (10) Number: US 7,036,728 C1
(45) Certificate Issued: *Oct. 4, 2011

(54) METHOD OF IMPROVING AIRLINE LUGGAGE INSPECTION

(76) Inventor: David Tropp, Brooklyn, NY (US)

Reexamination Request:
No. 90/011,312, Dec. 10, 2010

Reexamination Certificate for:
Patent No.: 7,036,728
Issued: May 2, 2006
Appl. No.: 10/988,433
Filed: Nov. 12, 2004

(*) Notice: This patent is subject to a terminal disclaimer.

Related U.S. Application Data (63) Continuation-in-part of application No. 10/756,531, filed on Jan. 12, 2004, and a continuation-in-part of application No. 10/706,500, filed on Nov. 12, 2003.

(51) Int. Cl.
*G07B 15/02* (2006.01)

(52) U.S. Cl. ............................. 235/334; 70/284; 283/72; 705/14.4

(58) Field of Classification Search ......................... None
See application file for complete search history.

(56) References Cited

U.S. PATENT DOCUMENTS 2,049,416 A * 8/1936 Aldeen ........................... 70/21

7,036,728 B2 * 5/2006 Tropp ........................ 235/384

OTHER PUBLICATIONS

FlyerTalk Internet Publication.Feb. 5, 2002, pp. 1-7.*
Child Seat Internet Publications, Dec. 1999-Jan. 31, 2002, pp. 1-4.*
MCMaster-Carr Supply Co Catalog 106 p. 2593, 2600 Copyright 2000, pp. 1-4.*
U.S. Government Commercial Item Description A-A-59486A for Padlock Set, Jul. 3, 2001. pp. 1-3.*
CNN.Com Transcript, Aug. 22, 2002, pp. 1-3.*

* cited by examiner

*Primary Examiner*—Cameron Saadat (57) ABSTRACT

Method of making airline luggage inspection secure while accommodating the needs of the traveler comprises making a special lock available to airline travelers, the special lock having combination lock portion and a master key lock, the master key lock portion receiving a master key that can open the master key lock portion of any special lock of this type. The special lock is designed to be applied to an individual piece of airline luggage and has indicia conveying to luggage purchasers that the special lock is "approved" by a luggage screening authority and conveying to the luggage screening authority that the special lock can be opened using the master key. The method includes providing the luggage screening authority directly or indirectly with exclusive access to the master key. The manufacturers and/or providers of the master key and special lock retain copies of the master key.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-20 is confirmed.

* * * * *